(12) United States Patent
Zhou et al.

(10) Patent No.: US 12,475,033 B2
(45) Date of Patent: Nov. 18, 2025

(54) OFFLOAD COMMAND EXECUTION FOR DATA PROCESSING ACCELERATION

(71) Applicants: Lemon Inc., Grand Cayman (KY); Beijing Volcano Engine Technology Co., Ltd., Beijing (CN)

(72) Inventors: Ping Zhou, Los Angeles, CA (US); Kan Frankie Fan, Los Angeles, CA (US); Hui Zhang, Los Angeles, CA (US)

(73) Assignees: Lemon Inc., Grand Cayman (KY); Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/396,842

(22) Filed: Dec. 27, 2023

(65) Prior Publication Data

US 2024/0126686 A1   Apr. 18, 2024

(51) Int. Cl.
G06F 12/02   (2006.01)
(52) U.S. Cl.
CPC ............... *G06F 12/0246* (2013.01)

(58) Field of Classification Search
CPC .................................. G06F 12/0246
See application file for complete search history.

(56) References Cited

U.S. PATENT DOCUMENTS

| | | | |
|---|---|---|---|
| 2012/0233434 A1* | 9/2012 | Starks | G06F 3/0689 711/170 |
| 2016/0170784 A1* | 6/2016 | Liguori | G06F 9/5027 718/1 |
| 2019/0042093 A1* | 2/2019 | Adams | G06F 3/0655 |
| 2020/0356493 A1* | 11/2020 | Mukherjee | G06F 9/45558 |
| 2021/0149815 A1* | 5/2021 | Gayen | G06F 12/10 |
| 2022/0166718 A1* | 5/2022 | Kamisetty | H04L 49/90 |
| 2022/0188028 A1* | 6/2022 | Mesnier | G06F 3/067 |

* cited by examiner

*Primary Examiner* — Tasnima Matin
(74) *Attorney, Agent, or Firm* — Fish & Richardson P.C.

(57) ABSTRACT

A system includes a host device, a hardware offload engine, and a non-volatile storage to store on-disk data. The hardware offload engine is represented to the host device as being a storage having a virtual storage capacity, and the host device transmits an offload command to the hardware offload engine as a data write command without requiring kernel changes or special drivers.

20 Claims, 6 Drawing Sheets

OFFLOAD COMMAND EXECUTION FOR DATA PROCESSING ACCELERATION

TECHNICAL FIELD

The embodiments described herein pertain generally to throughput of hardware offloading commands in a data processing environment that demands efficiency with minimal latency.

BACKGROUND

Non-volatile storage, e.g., block-level storage, is used to store data on storage area networks, e.g., servers, in cloud-based storage environments, data centers, etc. Data processing, including data analytics, are commonly offered by cloud service providers (CSPs). In such environments in which multiple requests requiring the parsing or scouring of significant amounts of data are managed simultaneously, data acceleration may be implemented by offloading operations from a host controller to the non-volatile storage system hardware, e.g., to controllers having hardware, software, and/or firmware, that are in communication with the non-volatile storage on the server or connected via a peripheral component interconnect express (PCIe) card.

For example, a database may create a plan to execute on a query, which may require execution in several stages that each execute on a separate operator, e.g., TableScan, file decompression, file decoding, etc. Because the data might be compressed on the disk and encoded in some format, for complex queries having a large magnitude of operators executed on a common CPU or on parallel CPUS, the output of results may be delayed.

Thus, for such a typical system, a hardware offload engine may be implemented, but the queried data files are presumed to be on the disk. A typical flow in such a hardware-offloaded system includes the host writing data files onto the disk; the host parsing the query and creating an I/O pipeline for the query; issuing a customized offload command to the hardware offload command engine; and, the hardware offload engine, to which operators are offloaded, reading data from disk and executing the operator on the data to thereby return a result to the host device.

Possible configurations for known hardware-offloaded data analytical systems include (1) disks being connected to a hardware offload engine, with all input/output requests, which may include regular data and offload commands, passing through the hardware offload engine; or (2) disks being directly connected to the host device, with regular data I/O being transmitted between the host device and disks, and offload commands being directed through a hardware offload engine.

SUMMARY

In one example embodiment, a system includes a host device, a hardware offload engine, and a non-volatile storage to store on-disk data. The hardware offload engine is represented to the host device as being a storage having a virtual storage capacity, and the host device transmits an offload command to the hardware offload engine as a data write command.

In accordance with at least one other example embodiment, a method performed by hardware offload engine in a data analytics system includes representing the hardware offload engine to a host device as a storage having a virtual storage capacity, receiving a data write command to the virtual storage capacity from the host device, and parsing the write command for parameters of an offload command. Data transmitted in the data write command includes the parameters of an offload command. The method further includes executing an operator included in the parameters of the offload command, and transferring results of the offload command to the host device.

In accordance with at least one other example embodiment, a non-volatile computer-readable medium has executable components that, when executed, causes one or more processors to transmit data write commands and receive results of the offload command from a hardware offload engine. The data write commands include at least an offload command that is transmitted to the hardware offload engine that is represented as a storage having a virtual storage capacity, and the data write commands transmitted to the hardware offload engine are transmitted in parallel via I/O channels that respectively correspond to one of the data write commands.

BRIEF DESCRIPTION OF THE DRAWINGS

In the detailed description that follows, embodiments of a hardware accelerator corresponding to a system having a host device and non-volatile storage are described as illustrations only since various changes and modifications will become apparent to those skilled in the art from the following detailed description. The use of the same reference numbers in different figures indicates similar or identical items.

DETAILED DESCRIPTION

Figure 1:
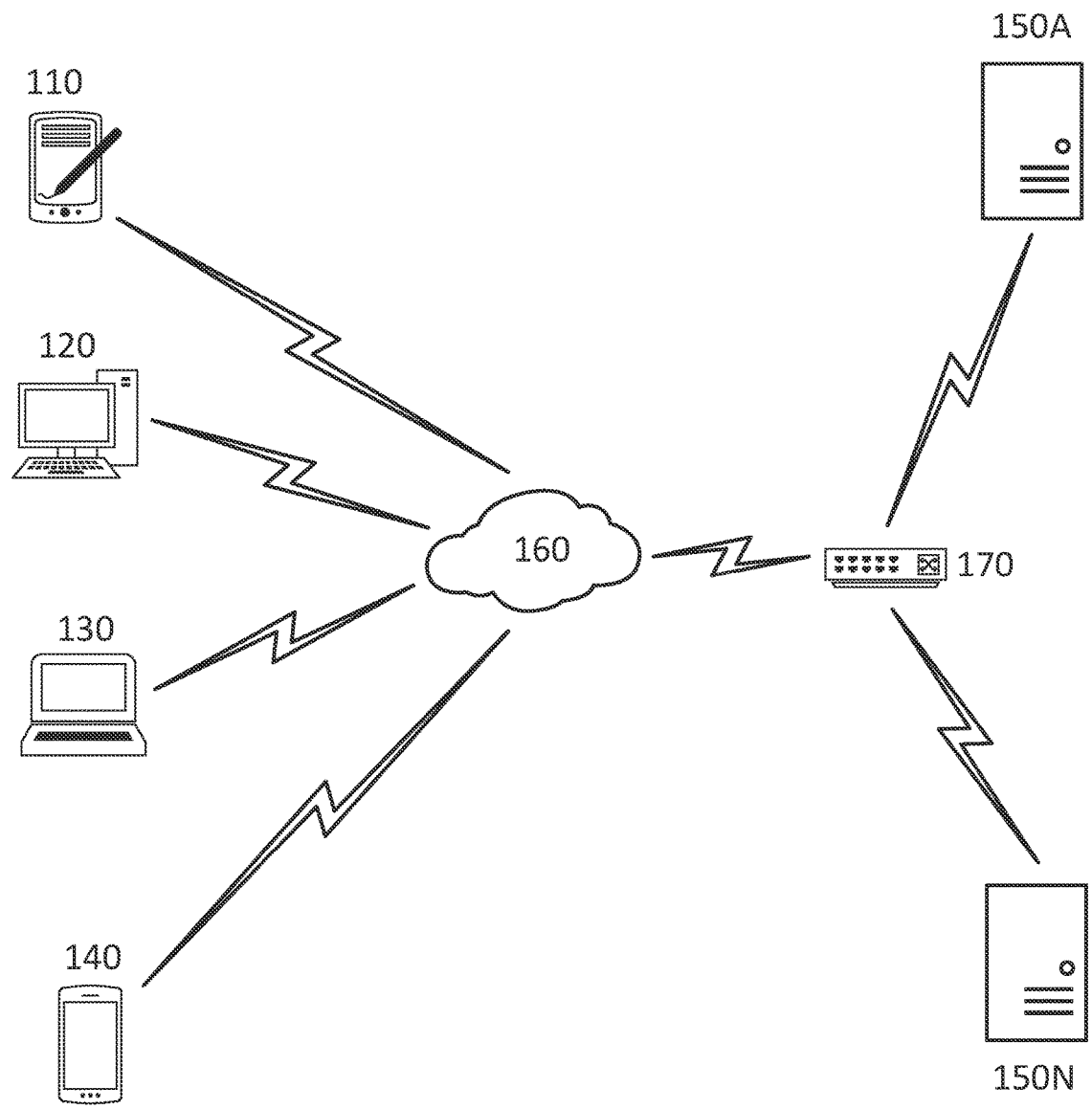
FIG. 1 shows a non-limiting example of a cloud-based storage system in which a hardware accelerator is implemented, arranged in accordance with at least some embodiments described and recited herein.

In the following detailed description, reference is made to the accompanying drawings, which form a part of the description. In the drawings, similar symbols typically identify similar components, unless context dictates otherwise. Furthermore, unless otherwise noted, the description of a successive drawing may reference features from any previous drawing to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein. It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. Additionally, the present disclosure may be described herein in terms of functional block components and various processing steps. It should be appreciated that such functional blocks may be realized by any number of hardware and/or software components configured to perform the specified functions. Additionally, portions of the present disclosure may be described herein in terms of functional block components and various processing steps. It should be appreciated that such functional blocks may be realized by any number of firmware, software, and/or hardware components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

A hardware accelerator, as referenced, disclosed, and/or recited herein may refer to a processor-enabled component that is configured to receive, via an interface for a hardware offloading engine, a hardware offloading command from the host device. A received offload command may include an operator and other data parameters for execution of the offload command, which may include but not be limited to, an input pointer, etc.

A hardware offload engine, as referenced, disclosed, and/or recited herein may be programmed, designed, or otherwise configured to parse from the offload command an operator, a total input size, operation code, input pointer, etc., for a received offload command; and to facilitate execution of the offloaded operation. In the context of a data analytics environment, a hardware offload engine may execute and/or facilitate interaction with one or more non-volatile storage components for the retrieval of data, per a request from a host device.

A non-volatile memory (NVMe), as referenced, disclosed, and/or recited herein, may refer to storage that is used to store data on storage area networks, e.g., servers, in cloud-based storage environments, at a data center, etc.

FIG. 1 shows a non-limiting example of a cloud-based storage system in which data processing, which may include but not be limited to data analytics, that utilizes a hardware accelerator may be implemented, arranged in accordance with at least some embodiments described and recited herein.

System 100 may be implemented in accordance with at least some embodiments described and recited herein. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

System 100 may include, but not be limited to, terminal devices 110, 120, 130, and 140; network 160; a host controller 170, e.g., host device; and one or more servers 150A . . . 150N. In accordance with the non-limiting example embodiments described and recited herein, FIG. 1 shows non-limiting quantities of the terminal devices, network, host device, and servers. That is, the number of terminal devices, networks, the host device, and/or servers described herein are provided for descriptive purposes only and are not intended to be limiting.

In accordance with at least some example embodiments, terminal devices 110, 120, 130, and 140 may be one or more of electronic devices including but not limited to table/e-reader 110, desktop computer 120, laptop computer 130, or smartphone 140.

In accordance with at least some non-limiting example embodiments described and recited herein, network 160 is designed programmed, or otherwise configured to provide a communications link between the terminal devices 110, 120, 130, 140 and one or more of servers 150. Network 160 may include, e.g., the Internet, a local area network (LAN), a wide area network (WAN), a local interconnect network (LIN), a cloud network, etc. Further, a communication link provided by or to network 160 may be implemented by any one or more of a wired communications link, a wireless communications link, an optical fiber cable, etc.

In accordance with at least some non-limiting example embodiments described and recited herein, host controller 170 is designed programmed, or otherwise configured to link servers 150A . . . 150N together, e.g., in a data center or to link other host controllers, e.g., in other data centers. Further, host controller 170 is designed programmed, or otherwise configured to send and/or receive applications, services, data, etc., to one or more of connected terminal devices 110, 120, 130, 140.

In accordance with at least some non-limiting example embodiments described and recited herein, one or more servers 150A . . . 150N are designed programmed, or otherwise configured to provide various services, e.g., cloud storage and/or computing services, including but not limited to data analytics, to end users that are using one or more of terminal devices 110, 120, 130, and 140. Servers 150A . . . 150N may be implemented as a data center that includes a distributed server cluster including one or more of servers 150A . . . 150N. In some embodiments, one or more data centers may be in communication with each other over network 160. One or more of servers 150A . . . 150N may also include a controller to control hardware and/or storing software and firmware and providing the functionalities of one or more of servers 150A . . . 150N.

Hereafter, unless context requires otherwise, reference will be made to "server 150," which is to convey implementation of one or more of servers 150A . . . 150N.

In some embodiments, server 150 may correspond physically or communicatively with one or more storage devices, e.g., non-volatile memory (NVM) solid state drives (SSDs), e.g., flash memory, using various communication interfaces that allow for robust data storage and/or retrieval on/from one or more such storage devices. In some embodiments, a communication interface between host controller 170 and sever 150 may be the non-volatile memory host controller interface protocol (NVMe). NVMe was developed in response to the need for a fast interface between computer processing units (CPUs) and SSDs. NVMe may be a logical device interface for accessing the SSDs connected to the server controller, for example, via a Peripheral Component Interconnect Express (PCIe) bus that provides a leaner interface for accessing the SSDs.

In accordance with at least some non-limiting example embodiments described and recited herein, a controller on host controller 170 may transmit, e.g., a NVMe disk access command, including data write commands, to a controller of server 150 using command queues. Controller administration and configuration may be handled via admin queues while input/output (I/O) queues may be used to handle data management. Each NVMe command queue may include one or more submission queues and one completion queue. Thus, commands may be provided from a controller of host controller 170 to a controller of server 150 via the submission queues and responses are returned to the controller on the host device via the completion queue. More particularly, a controller on host controller 170 may transmit data write commands and receive results of the offload command from a hardware offload engine. The data write commands may include at least an offload command that is transmitted to the hardware offload engine that is represented as a storage having a virtual storage capacity, and the data write commands transmitted to the hardware offload engine may be transmitted in parallel via I/O channels that respectively correspond to one of the data write commands.

An end user may use one or more of terminal devices 110, 120, 130, or 140 to interact with server 150 via network 160. In some embodiments, various applications that implement data processing capabilities, including data search and/or analytics, such as social media applications, social networking applications, shopping applications, gaming applications, etc., may be installed on terminal devices 110, 120, 130, or 140. In some embodiments, the end user of at least one of the terminal devices may request big data analytics or data mining on data on the storage devices connected to server 150 for supporting learning models.

In accordance with the non-limiting example embodiments described and recited herein, software applications or services provided by cloud service providers may be performed by host controller 170, server 150, and/or terminal devices 110, 120, 130, and/or 140 (hereafter referred to, in the alternatively, as user devices). Accordingly, the apparatus for the software applications and/or services may be arranged in the host controller 170, the server 150, and/or in terminal devices 110, 120, 130, and 140.

Further, terminal devices 110, 120, 130, and 140; host controller 170; and/or server 150 may each include one or more processors, firmware, and a storage device storing one or more programs; an Ethernet connector, a wireless fidelity receptor, etc. Further still, the one or more programs, when executed by the one or more processors, may cause the one or more processors to perform the methods described and/or recited herein. Also, a non-volatile computer readable medium may be provided according to the embodiments described herein to, at least, store computer programs that are used to, when being executed by a processor, perform the method(s) described in any embodiments described herein.

Figure 2:
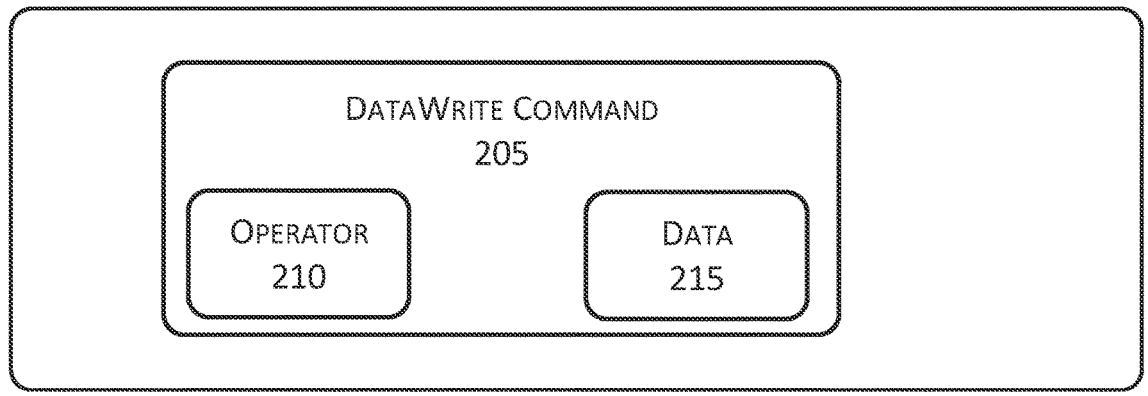
FIG. 2 is a schematic view of an input/output (I/O) command, in accordance with at least some embodiments described and recited herein.

FIG. 2 is a schematic view of an input/output (I/O) command, in accordance with at least some embodiments described and recited herein.

In accordance with the non-limiting example embodiments described and recited herein, I/O command 200 may be an offload command, written as a data-write command, that is transmitted from a host device to a hardware offload engine that is represented to the host device as having a virtual storage capacity. Further to the example embodiments, I/O data write command 200 may include, at least, data write command 205, operator 210, and data 215. As referenced herein, operator 210 may be regarded as a particular action to be executed, implemented, and/or facilitated by a hardware offload engine on data stored on storage disks 320 . . . 320N.

Non-limiting examples of operator 210 may include, but not be limited by, TableScan (decompressing and decoding), filtering, projection, aggregation, comparing, adding, subtraction, division, multiplication, shifting, inclusive or (OR), exclusive or (XOR), data mining, analysis, etc. As examples of operator 210, TableScan is an operator to read data from an NVM, decompress the data if it has been compressed, and decode the read data; and filtering is an operator to refine the data returned to the source of the operator.

Further to the non-limiting example embodiments described and recited herein, because offload operator 210 is performance critical, offload operator 210 is extensible, i.e., versatile. Thus, offload operator 210 is programmed, designed, or otherwise configured to be implemented in different command formats so as to provide support to multiple databases, e.g., NVM, without requiring modifications to a corresponding kernel or operating system (OS).

Data 215 may refer to the data parameters of the data write command that is transmitted as an I/O command. In contrast to normal I/O commands, as referenced herein, data 215 may be regarded as a portion of the offload command but not data to be stored on a hardware offload engine.

An innovative aspect of including offload operator 210 corresponding to I/O command 200 is apparent in the description of processing system 300, shown and described with reference to FIGS. 3A and 3B.

Figure 3A:
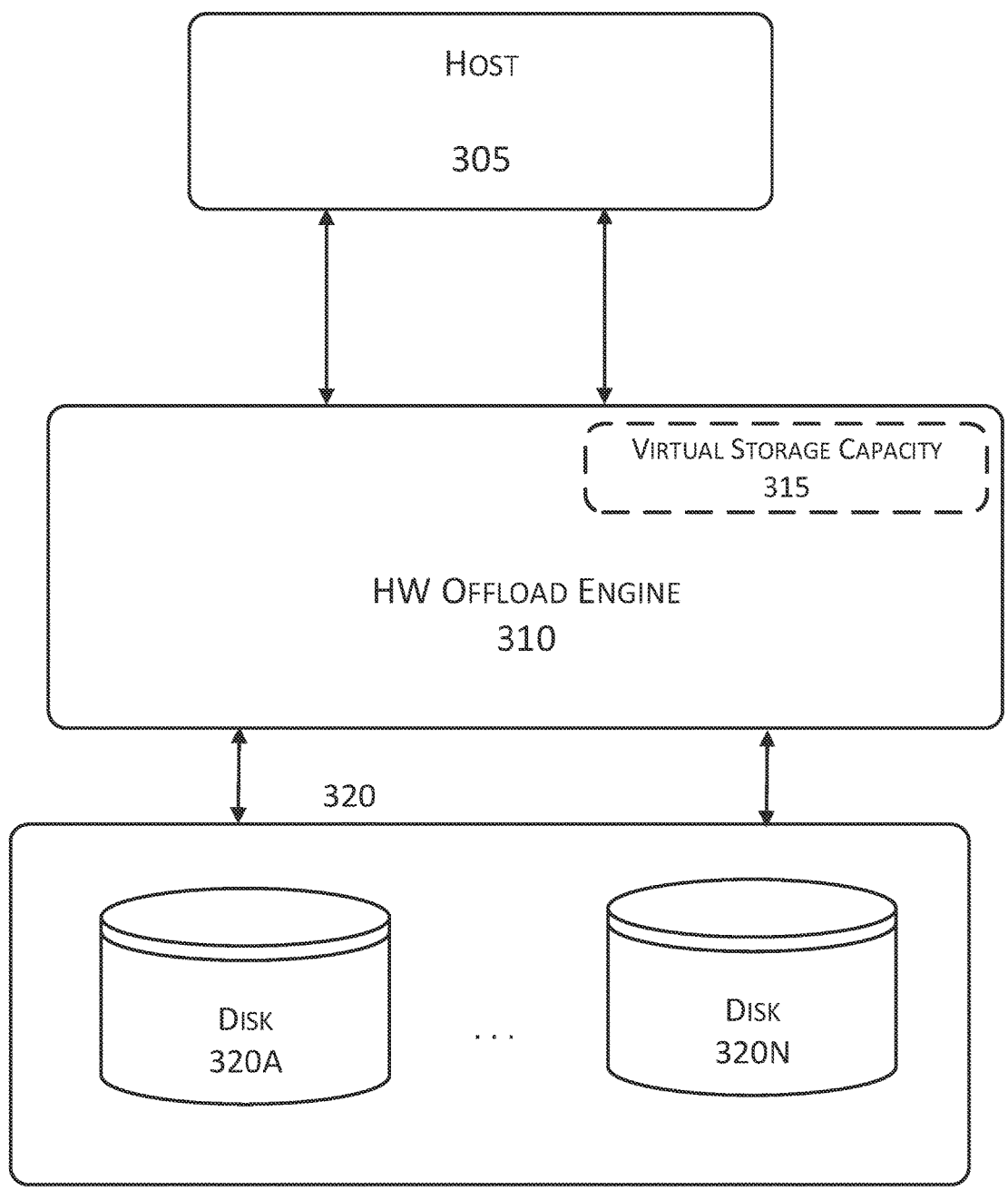
FIG. 3A shows a non-limiting example embodiment of a processing system, in accordance with at least some embodiments described and recited herein.
Figure 3B:
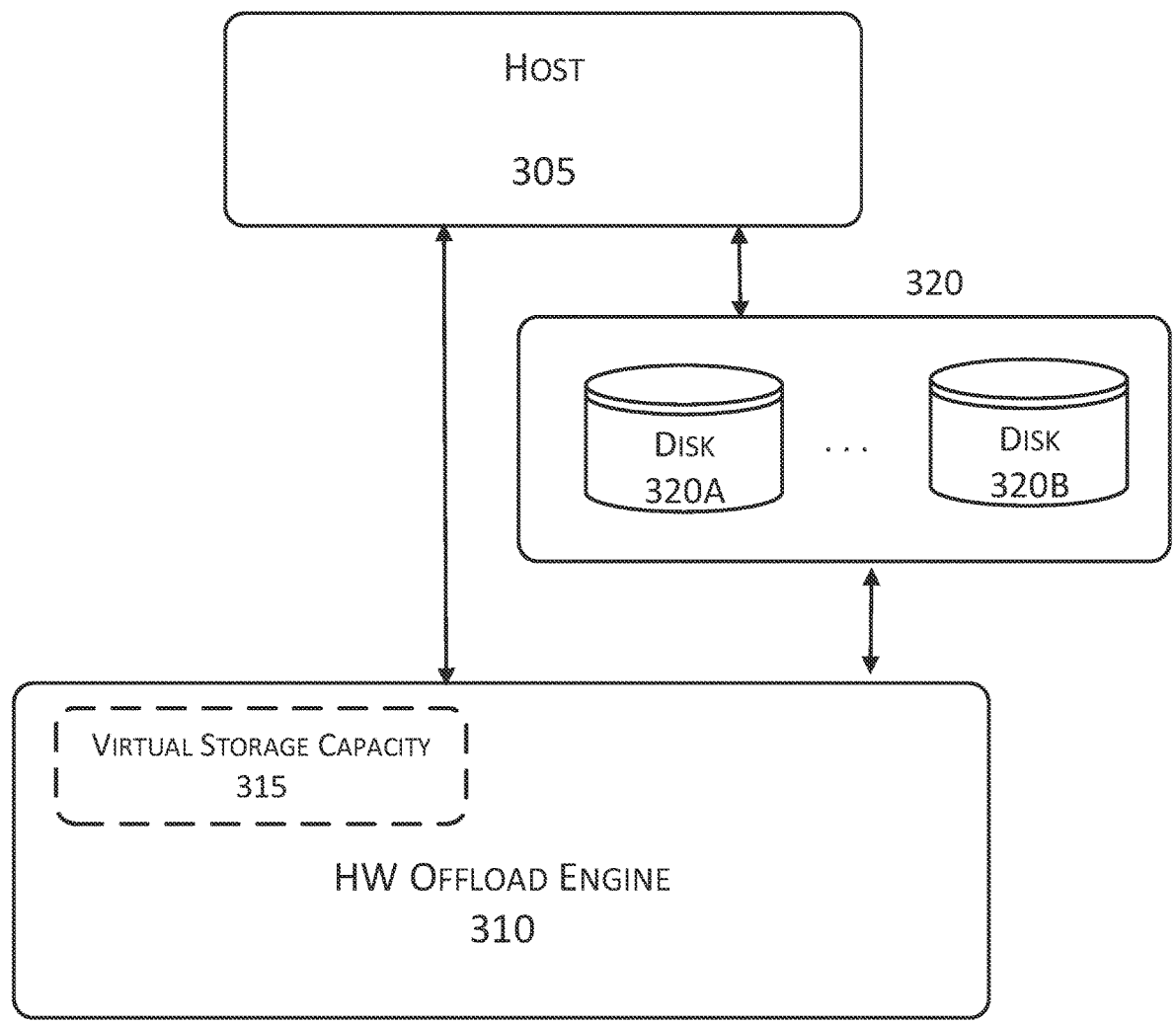
FIG. 3B also shows a non-limiting example embodiment of a processing system, in accordance with at least some embodiments described and recited herein.

FIGS. 3A and 3B show non-limiting example embodiments of processing systems, in accordance with offload command execution for data processing acceleration, as described and recited herein.

Offload commands are non-standard, custom-defined commands, and are therefore not naturally suited for common I/O channels that handle regular data I/O. Typically, as background context to the non-limiting innovative example embodiments described and recited herein, offload commands have previously been issued through administrative command channels, but such channels are designed for low-speed usage. For example, an administrative command on an NVMe device is limited to just one queue. Clearly, administrative channels provide low performance for hardware offload commands, particularly in an environment in which multiple hardware offload commands are issued within a short period of time.

Accordingly, per the description of I/O command 200 in FIG. 2, in accordance with the example embodiments of offload command execution for data processing acceleration, as described and recited herein, I/O command 200, which includes at least operator 210 and data/parameters 215 is transmitted through a virtual I/O channel on a hardware offload engine, thus providing a high-efficiency throughput, i.e., reduced latency, and parallelism of such offload commands, as well as a high-level of flexibility and extensibility.

The non-limiting example embodiments of FIGS. 3A and 3B include, e.g., host device 305, hardware offload engine 310, virtual storage capacity 315, and NVM 320, with example storage devices 320A and 320B.

Host device 305, which may correspond to host controller 170 (see FIG. 1), may have loaded and/or executing thereon a device driver to facilitate communications with hardware offload engine 310 and NVM 320. In accordance with at least one non-limiting example embodiment, host device 305 may have loaded and/or executed thereon a non-volatile storage, non-transitory computer-readable medium having executable instructions stored thereon that, when executed, causes one or more processors to transmit data write commands and receive results of the offload command from the hardware offload engine. The data write commands may include at least an offload command that is transmitted to a hardware offload engine that is represented as a storage having a virtual storage capacity. Further, the data write commands transmitted to the hardware offload engine are transmitted in parallel via I/O channels that respectively correspond to one of the data write commands. The data write commands may also include read/write commands for data stored in NVM 320. Further still, each of the data write commands transmitted to the hardware offload engine indicates a respectively corresponding logical block address corresponding to the virtual storage capacity of the hardware offload engine, and results of an offload command may be received via direct memory access.

Hardware offload engine 310, as stated above, may be represented to host device 305 as a virtual I/O disk having virtual capacity 315. That is, hardware offload engine 310 is represented as having storage capacity, while actually not having any. Hardware offload engine 310, in accordance with non-limiting example embodiments described and recited herein, may be implemented as software or as a card that may be inserted into, e.g., host device 305. A non-limiting example of hardware offload engine 310 is an add-in card, such as a PCIe card, to be communicatively connected directly or remotely with storage device 310 and/or host device 305.

More particularly, in accordance with at least one non-limiting example embodiment, at system start-up, e.g., boot-up, when devices on a PCI bus are enumerated, hardware offload engine 310 is represented to host device 305 as a storage device having a small storage capacity, e.g., 4 MB.

However, the storage capacity 315 represented to host device 305 is merely virtual. Still, host device 305 regards hardware offload engine 310 as a hardware device with the represented storage capacity the type to which host device 305 may be designed, programmed, or otherwise configured to write, at least, data write commands.

Further, hardware offload engine 310 may create a virtual I/O channel by which one or more of I/O commands 200 may be issued. Accordingly, the non-limiting example embodiments are programmed, designed, or otherwise configured to implement a high-level of performance, i.e., low level of latency, and parallelism for I/O channels, by which hardware offload commands are transmitted and results of such commands are returned without inclusion or need of kernel changes and/or special drivers. Thus, an operating system is to recognize a corresponding hardware offload command as a regular I/O command.

NVM 320, which may include one or more of storage devices 320A . . . 320N, may refer to solid state drives (SSD) that may be designed, programmed, or otherwise configured to facilitate quick and efficient data storage and retrieval.

Storage devices 320A . . . 320N may be in communication with host device 305 via the hardware offloading engine 310, as in FIG. 3A; or storage devices 320A . . . 320N may be in direct communication with both host device 305 and hardware offloading engine 310, as in FIG. 3B.

In accordance with the example embodiment of FIG. 3A, host device 305 may write both regular data I/O commands and hardware offload commands (in the form of regular data I/O commands) to hardware offload engine 310; thus, hardware offload engine 310 may function as a conduit for both regular data I/O commands and hardware offload commands between host device 305 and any one or more of storage devices 320A . . . 320N corresponding to NVM 320. As referenced herein, a regular data I/O command may be regarded as an I/O command that is naturally suited for common I/O channels that handle regular data I/O, without being custom-defined. It is through these common I/O channels that hardware offload engine 310 returns results of the regular data I/O commands from NVM 320 to host device 305. Further, host device 305 transmits offload commands to hardware offload engine 310 via a virtual I/O channel. It is through the virtual I/O channels that hardware offload engine 310 returns results of the hardware offload commands to host device 305.

In accordance with the example embodiment of FIG. 3B, host device 305 may write regular data I/O commands directly to any one or more of storage devices 320A . . . 320N corresponding to NVM 320 via regular I/O channels; and, further, may write offload commands to hardware offload engine 310, via virtual I/O channels, which may then facilitate execution of a received offload command by directly accessing any one or more of storage devices 320A . . . 320N corresponding to NVM 320. Results of regular data I/O commands may be returned to host device 305 from any one or more of storage devices 320A . . . 320N corresponding to NVM 320 via regular I/O channels; and results of hardware offload commands may be returned to host device 305 from hardware offload engine 310 via the virtual I/O channels.

Figure 4:
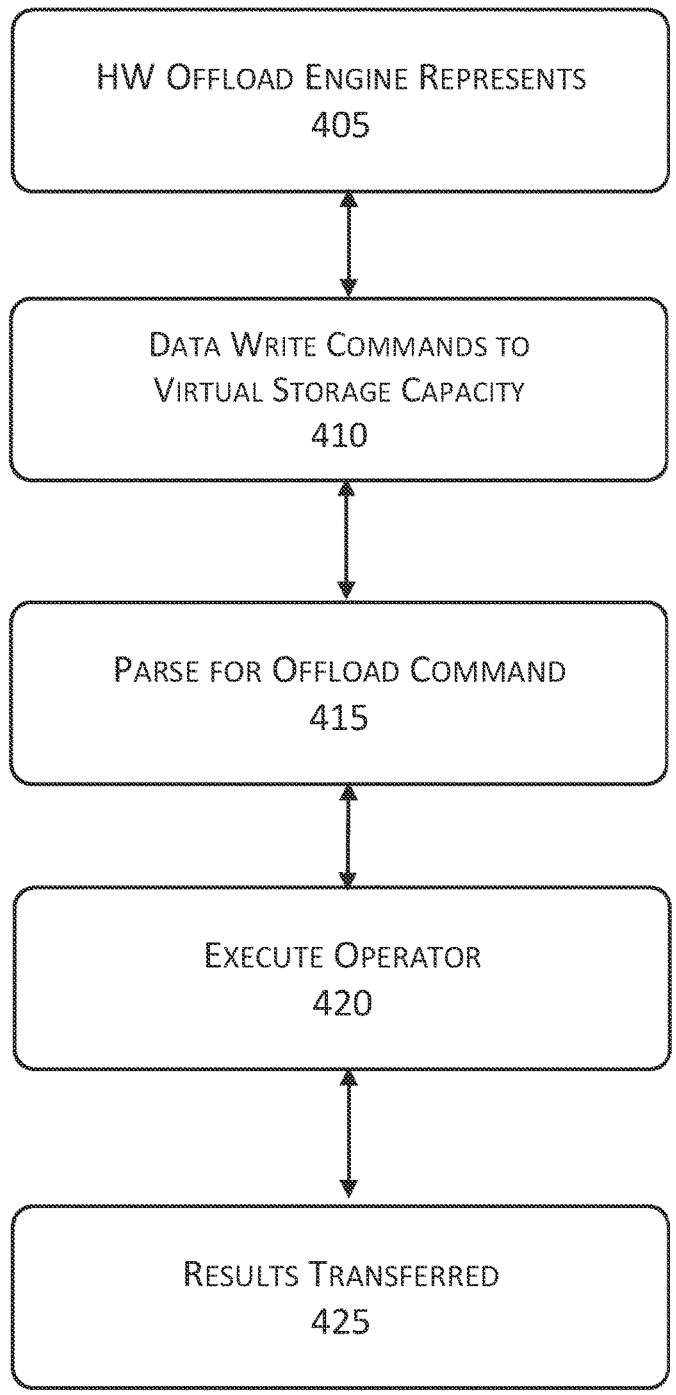
FIG. 4 shows a non-limiting example processing flow, in accordance with at least some embodiments described and recited herein.

FIG. 4 shows a non-limiting example processing flow, in accordance with at least some embodiments described and recited herein. It is to be understood that processing flow 400 described and recited herein may be conducted, executed, or implemented by one or more processors, e.g., local CPU of a device, including but not limited to a processor of host device 305, hardware offload engine 310, NVM 320, and their equivalents, e.g., those shown and described with reference to FIG. 1.

It is also to be understood that processing flow 400 may include one or more operations, actions, or functions as illustrated by one or more of blocks 405, 410, 415, 420, and 425. These various operations, functions, or actions may, for example, correspond to software, firmware, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before processing flow 400, operations including initializations or the like may be performed. For example, system parameters and/or application parameters may be initialized. It is to be understood that the processes, operations, or actions described in FIGS. 1-3A and 3B may be implemented or performed by the processor. Processing flow 400 may begin at block 405.

Block 405 (HW offload engine represents) may refer to hardware offload engine 310 being represented, actively or passively to host device 305 as a storage device having a small storage capacity, e.g., 4 MB, at system start-up, e.g., boot-up, or any other time when devices on a PCI bus are enumerated. That is, block 405 may result in host device 305 seeing a, e.g., 4 MB, storage device in addition to NVM 320. Flow 400 may proceed from block 405 to block 410.

Block 410 (DataWrite commands to virtual storage capacity) may refer to host device 305 issuing hardware offload commands as regular data write commands 205, as I/O commands 200, that are targeted for the virtual storage capacity 315 of hardware offload engine 310. The logical block address (LBA) of data write commands 205 may be any one of the LBAs within virtual capacity 315. Further, each of data write commands 205 is to include an operator 210 and data 215 as the parameters of the offload command. It is to be understood that regular data I/O to and from host device 305 are unchanged. Flow 400 may proceed from block 410 to block 415.

Block 415 (Parse for offload command) may refer to hardware offload engine 310 parsing operator 210 and data 215 from data write command 205. Flow 400 may proceed from block 415 to block 420.

Block 420 (Execute operator) may refer to hardware offload engine 310, which is communicatively connected to storage devices 310A . . . 320N of NVM 320, executing operator 210 on data stored in one or more of storage devices 320A . . . 320N of NVM 320. Flow 400 may proceed from block 420 to block 425.

Block 425 (Results transferred) may refer to hardware offload engine 310 transmitting results of the offload command back to host device 305 using direct memory access (DMA). Upon completion of the hardware offload command, hardware offload engine 310 may complete the command as a regular write command.

That is, since the offload command is issued as a regular I/O write command 200, existing I/O channels may be leveraged to achieve high performance, e.g., multiple queues for a higher degree of parallelism. Further, as parameters of the offload command, e.g., operator 210 and data 215, are passed as data of data write command 205, the example embodiments described and recited herein entail a flexible model by which any custom format may be defined for the parameters. Further still, because virtual capacity 315 of hardware offload engine 310 is represented, actively or passively, as being comparatively small with regard to, e.g., any of storage devices 320A . . . 320N, different LBAs may be utilized to differentiate between different hardware offload commands 205. Also, the targeting of specific LBAS may be regarded as identification of a particular one of storage devices 320A . . . 320N to be accessed by hardware offload engine 310. Thus, the example embodiments provide significant flexibility for extending offload features of system 300.

Figure 5:
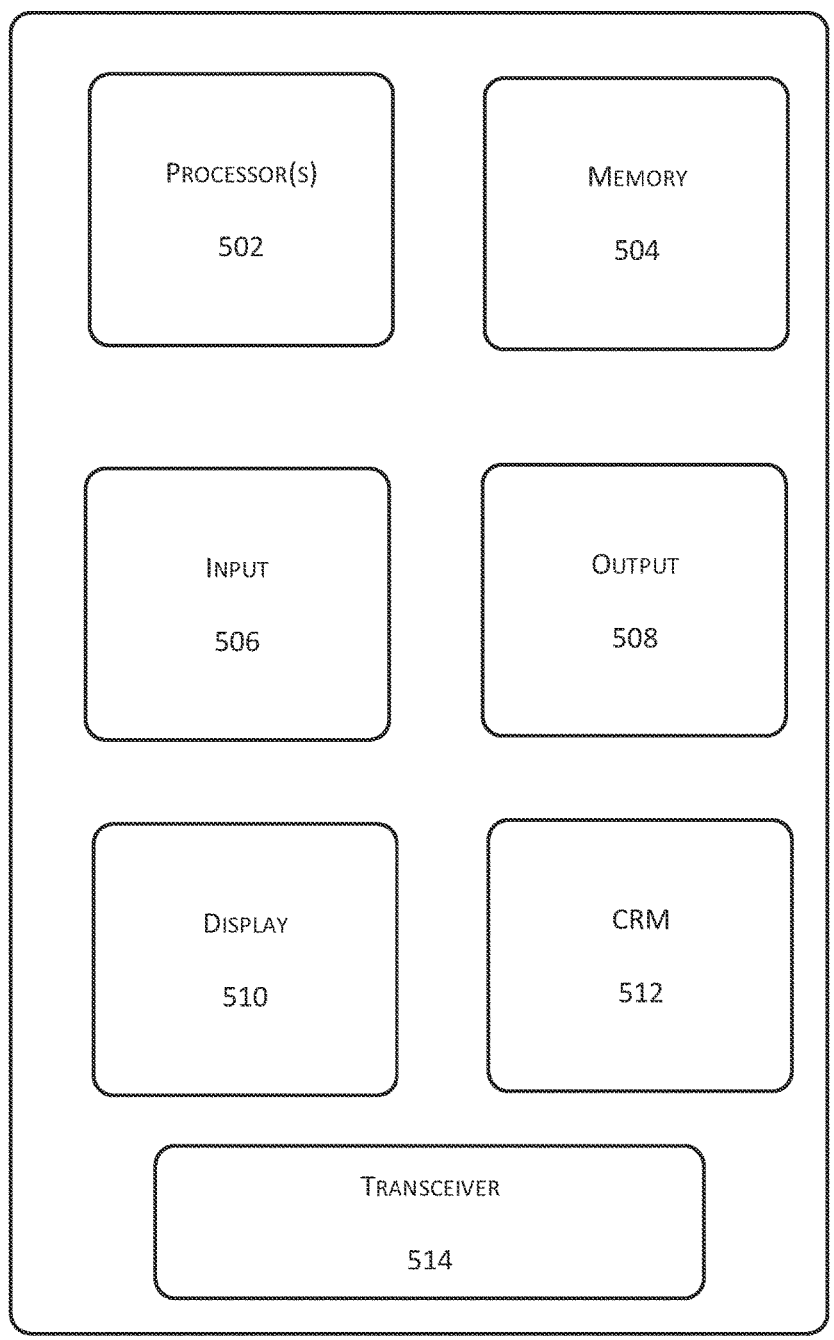
FIG. 5 shows an illustrative computing embodiment, in which hardware accelerator 220 may be implemented as executable components or modules stored on a non-volatile computer-readable medium.

FIG. 5 shows an illustrative computing embodiment, in which hardware accelerator 220 may be implemented as executable components or modules stored on a non-volatile computer-readable medium. The computer-readable modules may, for example, be executed by a processor of a device, as referenced herein, having a network element and/or any other device corresponding thereto, particularly as applicable to the applications and/or programs described above corresponding to architecture 200.

In a very basic configuration, a computing device 500 may typically include, at least, one or more processors 502, a memory 504, one or more input components or modules 506, one or more output components or modules 508, a display component or module 510, a computer-readable medium 512, and a transceiver 514.

Processor 502 refers to, e.g., a microprocessor, a microcontroller, a digital signal processor, or any combination thereof.

Memory 504 refers to, e.g., a volatile memory, non-volatile memory, or any combination thereof. Memory 504 stores therein an operating system, one or more applications corresponding to offloading engine 310 and/or program data therefore. That is, memory 504 stores executable instructions to implement any of the functions or operations described above and, therefore, memory 504 may be regarded as a computer-readable medium.

Input component or module 506 refers to a built-in or communicatively coupled keyboard, touch screen, or telecommunication device. Further, input component or module 506, if not built-in to computing device 500, may be communicatively coupled thereto via short-range communication protocols including, but not limitation, radio frequency or Bluetooth®.

Output component or module 508 refers to a component or module, built-in or removable from computing device 500 that is configured to output commands and data to an external device.

Display component or module 510 refers to, e.g., a solid state display that may have touch input capabilities. That is, display component or module 510 may include capabilities that may be shared with or replace those of input component or module 506.

Computer-readable medium 512 refers to a separable machine-readable medium that is configured to store one or more components or modules described above. That is, computer-readable medium 512, which may be received into or otherwise connected to a drive component or module of computing device 500, may store executable components or modules to function or operate as described above.

Transceiver 514 refers to a network communication link for computing device 500, configured as a wired network or direct-wired connection. Alternatively, transceiver 514 is configured as a wireless connection, e.g., radio frequency (RF), infrared, Bluetooth®, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

ASPECTS

Aspect 1. A system, comprising:
a host device; and
a hardware offload engine: and
a non-volatile storage to store on-disk data,
wherein
   the hardware offload engine is represented to the host device as being a storage having a virtual storage capacity, and
   the host device transmits an offload command to the hardware offload engine as a data write command.

Aspect 2. The system of Aspect 1, wherein data of the offload command transmitted as a write command includes parameters of the offload command.

Aspect 3. The system of either Aspect 1 or Aspect 2, wherein a logical block address of the write command is any one of plural logical block addresses corresponding to the virtual storage capacity.

Aspect 4. The system of any of Aspects 1 to 3, wherein each of the plural logical block addresses corresponds to a respective type of offload command.

Aspect 5. The system of any of Aspects 1 to 4, wherein the hardware offload engine is configured to:
- receive data from the host device, the received data including the data write command;
- parse the offload parameters from the data write command, the data write command including an operator for the offload command;
- execute the operator for the offload command; and
- transfer results of the offload command to the host device using direct memory access.

Aspect 6. The system of any of Aspects 1 to 5, wherein the hardware offload engine is further configured to complete the offload command using a data write command.

Aspect 7. The system of any of Aspects 1 to 6, wherein the offload command is transmitted as a write command by a data I/O channel.

Aspect 8. The system of any of Aspects 1 to 7, wherein multiple offload commands are transmitted in parallel as correspondingly respective data write commands via respective data I/O channels.

Aspect 9. The system of any of Aspects 1 to 8, wherein the multiple offload commands are generated from a single query.

Aspect 10. The system of any of Aspects 1 to 9, wherein the system is included in a data analytics system.

Aspect 11. The system of any of Aspects 1 to 9, wherein the system is included in a data processing system.

Aspect 12. A method performed by hardware offload engine in a data analytics system, the method comprising:
- representing the hardware offload engine to a host device as a storage having a virtual storage capacity;
- receiving a data write command to the virtual storage capacity from the host device;
- parsing the write command for parameters of an offload command,
  - wherein data transmitted in the data write command includes the parameters of an offload command;
- executing an operator included in the parameters of the offload command; and
- transferring results of the offload command to the host device.

Aspect 13. The method of Aspect 12, wherein a logical block address of the data write command is any one of plural logical block addresses corresponding to the virtual storage capacity.

Aspect 14. The method of either Aspect 12 or Aspect 13, wherein each of the plural logical block addresses corresponds to a respective offload command.

Aspect 15. The method of any of Aspects 12 to 14, wherein the offload command is received as the data write command by a data I/O channel.

Aspect 16. The method of any of Aspects 12 to 15, wherein multiple write commands including the parameters of correspondingly respective offload commands are received in parallel via respective data I/O channels.

Aspect 17. A non-transitory computer-readable medium having stored thereon executable instructions that, when executed, cause one or more processors to:
- transmit data write commands, wherein the data write commands include at least an offload command that is transmitted to a hardware offload engine that is represented as a storage having a virtual storage capacity, wherein the data write commands transmitted to the hardware offload engine are transmitted in parallel via I/O channels that respectively correspond to one of the data write commands;
- receive results of the offload command from the hardware offload engine.

Aspect 18. The non-transitory computer-readable medium of Aspect 17, wherein the instruction to transmit data write commands cause the one or more processors to transmit data write commands that include read/write commands to a non-volatile storage.

Aspect 19. The non-transitory computer-readable medium of either Aspect 17 or Aspect 18, wherein each of the data write commands transmitted to the hardware offload engine indicates a respectively corresponding logical block address corresponding to the virtual storage capacity of the hardware offload engine.

Aspect 20. The non-transitory computer-readable medium of any of Aspects 17 to 19, wherein the results of the offload command are received via direct memory access.

The invention claimed is:

1. A system, comprising:
   a host device; and
   a hardware offload engine; and
   a non-volatile storage to store on-disk data,
   wherein:
   the hardware offload engine is represented to the host device as being a storage having a virtual storage capacity, and
   the host device transmits an offload command to the hardware offload engine as a data write command, wherein the offload command is transmitted via a virtual I/O channel created by the hardware offload engine.

2. The system of claim 1, wherein data of the offload command transmitted as a write command includes parameters of the offload command.

3. The system of claim 1, wherein a logical block address of the data write command is any one of plural logical block addresses corresponding to the virtual storage capacity.

4. The system of claim 3, wherein each of the plural logical block addresses corresponds to a respective type of the offload command.

5. The system of claim 1, wherein the hardware offload engine is configured to:
   receive data from the host device, the received data including the data write command;
   parse offload parameters from the data write command, the data write command including an operator for the offload command;
   execute the operator for the offload command; and
   transfer results of the offload command to the host device using direct memory access.

6. The system of claim 2, wherein the hardware offload engine is further configured to complete the offload command using a data write command.

7. The system of claim 2, wherein the offload command is transmitted as a write command by a data I/O channel.

8. The system of claim 7, wherein multiple offload commands are transmitted in parallel as correspondingly respective data write commands via respective data I/O channels.

9. The system of claim 8, wherein the multiple offload commands are generated from a single query.

10. The system of claim 9, wherein the system is included in a data analytics system.

11. The system of claim 9, wherein the system is included in a data processing system.

12. A method performed by hardware offload engine in a data analytics system, the method comprising:
    representing the hardware offload engine to a host device as a storage having a virtual storage capacity;

receiving a data write command to the virtual storage capacity from the host device;

parsing the data write command for parameters of an offload command,
wherein data transmitted in the data write command includes the parameters of an offload command;

executing an operator included in the parameters of the offload command; and transferring results of the offload command to the host device, wherein the results of the offload command are transmitted via a virtual I/O channel created by the hardware offload engine.

13. The method of claim 12, wherein a logical block address of the data write command is any one of plural logical block addresses corresponding to the virtual storage capacity.

14. The method of claim 13, wherein each of the plural logical block addresses corresponds to a respective offload command.

15. The method of claim 13, wherein the offload command is received as the data write command by a data I/O channel.

16. The method of claim 15, wherein multiple write commands including the parameters of correspondingly respective offload commands are received in parallel via respective data I/O channels.

17. A non-transitory computer-readable medium having stored thereon executable instructions that, when executed, cause one or more processors to:

transmit data write commands, wherein the data write commands include at least an offload command that is transmitted to a hardware offload engine that is represented as a storage having a virtual storage capacity,
wherein the data write commands transmitted to the hardware offload engine are transmitted in parallel via I/O channels that respectively correspond to one of the data write commands, and the offload command is transmitted via a virtual I/O channel created by the hardware offload engine; and receive results of the offload command from the hardware offload engine, wherein the results of the offload command are transmitted via the virtual I/O channel.

18. The non-transitory computer-readable medium of claim 17, wherein the instruction to transmit data write commands cause the one or more processors to transmit the data write commands that include read/write commands to a non-volatile storage.

19. The non-transitory computer-readable medium of claim 17, wherein each of the data write commands transmitted to the hardware offload engine indicates a respectively corresponding logical block address corresponding to the virtual storage capacity of the hardware offload engine.

20. The non-transitory computer-readable medium of claim 17, wherein the results of the offload command are received via direct memory access.

* * * * *